United States Patent [19]

Lewalter et al.

[11] 4,298,515

[45] * Nov. 3, 1981

[54] PROCESS FOR THE PREPARATION OF POLYMERS CONTAINING HYDANTOIN GROUPS

[75] Inventors: Jürgen Lewalter; Ludwig Rottmaier, both of Odenthal; Rudolf Merten, Leverkusen; Wilfried Zecher, Leverkusen; Willi Dünwald, Leverkusen; Bernhard Schulte, Krefeld, all of Fed. Rep. of Germany

[73] Assignee: Bayer Aktiengesellschaft, Leverkusen, Fed. Rep. of Germany

[*] Notice: The portion of the term of this patent subsequent to May 26, 1998, has been disclaimed.

[21] Appl. No.: 100,870

[22] Filed: Dec. 6, 1979

[30] Foreign Application Priority Data

Dec. 16, 1978 [DE] Fed. Rep. of Germany ....... 2854383

[51] Int. Cl.³ .......................................... C08G 18/06
[52] U.S. Cl. ...................... 260/30.4 N; 260/31.2 N; 260/32.2; 525/440; 528/48; 528/49; 528/52; 528/73; 528/74; 528/75; 528/84
[58] Field of Search ...................... 528/48, 49, 52, 73, 528/74, 75, 84; 260/30.4 N, 31.2 N, 32.2; 525/440

[56] References Cited

U.S. PATENT DOCUMENTS 3,397,253  8/1968  Merten et al. .............. 260/DIG. 34
3,705,874 12/1972  Merten et al. ...................... 521/159

*Primary Examiner*—Maurice J. Welsh
*Attorney, Agent, or Firm*—Connolly and Hutz

[57] ABSTRACT

A process for the production of modified polyhydantions by reacting polyglycine acid derivatives with optionally masked polyisocyanates with the addition of cyclic anhydride compounds containing at least one further functional group capable of condensation in lactones as solvents.

10 Claims, No Drawings

PROCESS FOR THE PREPARATION OF POLYMERS CONTAINING HYDANTOIN GROUPS

Processes for the preparation of polyhydantoin polymers by the reaction of glycine ester derivatives and polyisocyanates have already been disclosed, for example, in U.S. Pat. No. 3,397,253 (BE 678,282).

The procedure described there has been modified in order to prepare polyhydantoins containing hydantoin groups and other functional groups such as amide, imide or ester groups. Numerous different solvents have been recommended. The best quality polymers containing hydantoin groups have hitherto only been obtained when using phenolic solvents such as phenol, cresols or xylenols, either alone or as mixtures.

The use of phenolic solvents, however, gives rise to environmental pollution and therefore requires elaborate recovery plants for the quantitative recovery of these solvents or their quantitative removal from effluents and exhaust air.

There is therefore a considerable technical interest in finding an electrically insulating lacquer which has the excellent properties of polyhydantoins but which can be prepared and processed in solvents which are environmentally harmless.

The present invention therefore relates to a process for the preparation of poly(thio)hydantoins containing amidoimide groups by the reaction of polyfunctional α-aminocarboxylic acid derivatives with organic polyisocyanates or masked iso(thio)cyanates wherein the reaction is carried out in lactones as solvents with the use of cyclic carboxylic acid anhydride compounds containing an additional group which is capable of condensation.

Polyamidoimidehydantoins prepared in this manner can be directly applied as lacquers or after the addition of another lactone or of other environmentally harmless non-phenolic solvents.

The present invention therefore also relates to lacquer solutions, in particular for stoving lacquers containing polyhydantoins which have been prepared by the process according to the present invention.

These lacquers have excellent properties at least equal to those of lacquers prepared from phenolic solvents. This is all the more surprising since these qualities are not found either in lacquers obtained from polyhydantoin solutions or in lacquers obtained from polyamidoimide solutions prepared using enviromentally harmless solvents.

The solvents to be used according to the present invention are lactones having from 3 to 16 carbon atoms, preferably γ-butyrolactone. These solvents may, if desired, be mixed with other suitable environmentally harmless non-phenolic solvents particularly if they are to be used for the manufacture of lacquers. Examples of such include ethyl benzoate, benzyl acetate, propylene carbonate, benzyl alcohol, phenoxyethanol and acetophenone. Glycols and their derivatives such as glycol mono- or dialkyl ethers or esters in particular ethylene glycol and its monoethers and diethers such as methyl glycol and dipropyleneglycol diethylether and their acetates such as ethyl glycol acetate and methyl glycol acetate may also be used. In addition, aliphatic and aromatic hydrocarbons such as cyclohexane, xylene, toluene and commercial mixtures thereof such as Solvesso 100 and solvent naphtha may be used as diluents.

The substances used for the process according to the present invention are preferably polyfunctional, more particularly difunctional α-aminocarboxylic acid derivatives corresponding to the following general formula (I):

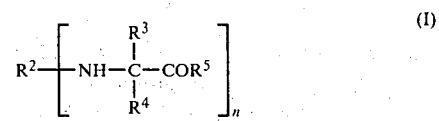

wherein $R^2$ represents an alkyl group having from 2 to 20 carbon atoms optionally substituted with one or more halogen atoms or with one or more $C_1$–$C_{10}$ alkyl groups and/or with one or more $C_6$–$C_{12}$ aryl groups, an aryl group having from 5 to 12 carbon atoms, a cycloalkyl group having from 5 to 12 carbon atoms, an alkylaryl group having from 6 to 20 carbon atoms or an aryl or cycloalkyl group having from 5 to 12 ring carbon atoms and containing one or more heteroatoms such as N and/or O and/or S in the ring; $R^3$ and $R^4$ the same or different represent hydrogen, a $C_1$–$C_{20}$ alkyl group, a $C_5$–$C_{12}$ aryl group or a $C_6$–$C_{20}$ aralkyl group; $R^5$ represents a hydroxyl group, an amino group, a $C_1$–$C_{20}$ alkylamino group, a $C_1$–$C_{20}$ dialkylamino group, a $C_1$–$C_{20}$ alkoxy group or a $C_5$–$C_{12}$ aroxy group and n represents an integer of from 2 to 4, preferably 2. These compounds have been disclosed in U.S. Pat. No. 3,397,253.

Aromatic groups for $R^2$ are preferred, particularly those of benzene, azobenzene, naphthalene, anthracene, diphenyl, triphenylmethane, diphenylmethane and diphenylether. These groups may also carry one or more substituents such as $C_1$–$C_{20}$ alkyl (methyl), halogen atoms (chloro), nitro, $C_1$–$C_{20}$ alkoxy (methoxy), $C_1$–$C_{20}$ dialkylamino (dimethylamino), acyl (acetyl), $C_2$–$C_{17}$ carbalkoxy (carbomethoxy or carbethoxy) and cyano groups. The groups optionally substituted with one or two methyl and/or chloro groups or with one or two carboxyl groups are preferred, in particular those of benzene, naphthalene, diphenylmethane or diphenylether.

The groups $R^3$ and $R^4$ may also be joined together as members of a cyclic $C_2$–$C_{20}$ alkyl group, and they may be substituted by halogen atoms (chlorine, bromine), or by one or more cyano, hydroxycarbonyl, aminocarbonyl, alkoxycarbonyl or aroxycarbonyl groups.

The preparation of α-aminocarboxylic acid derivatives which are to be used as starting materials according to the present invention is known in principle and may be carried out by, for example, the reaction of aromatic amines or aminocarboxylic acids with haloacetic acid or derivatives thereof or by condensation with hydrocyanic acid and aldehydes or ketones followed by conversion of the nitrile group, e.g. into carboxylic acid, ester or amide.

The cyclic carboxylic acid anhydride compounds used for the process according to the present invention are preferably those corresponding to the following general formula II:

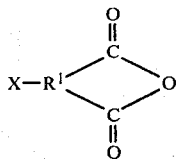 (II)

wherein $R^1$ represents a $C_2$–$C_{10}$ aliphatic group, a $C_5$–$C_{10}$ cycloaliphatic group or a $C_6$–$C_{20}$ aromatic group and X represents another cyclic anhydride group, a carboxyl group or an OH group. X preferably represents a carboxyl group.

The following compounds are given as examples:

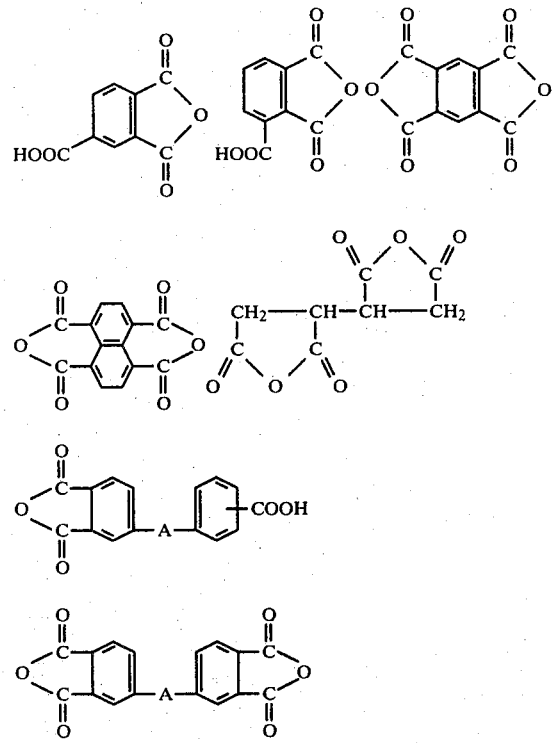

where A =

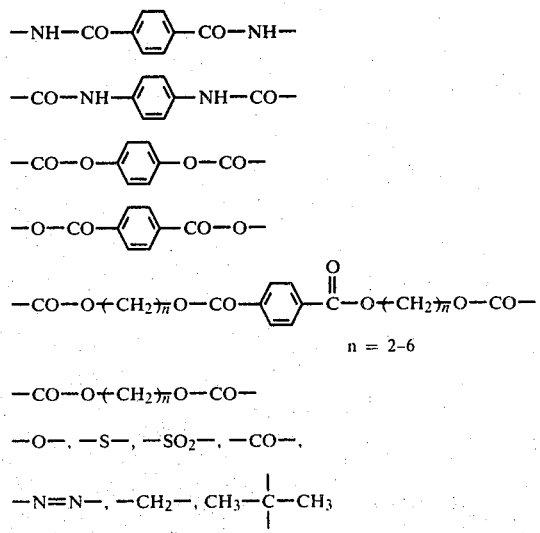

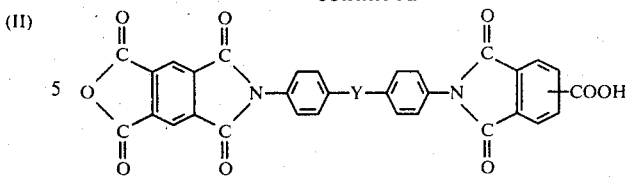

$Y = -O-, -S-, -SO_2-,$ $-CO-, -N=N-$ $-CH_2-, CH_3-\underset{|}{\overset{|}{C}}-CH_3$ Acid derivatives other than carboxylic acid anhydrides may be used, for example, the corresponding esters or the polycarboxylic acids themselves, which react with the acid anhydrides in the course of the reaction. Trimellitic acid anhydride is preferably used. The carboxylic acid anhydrides may, however, be replaced by aromatic and aliphatic dicarboxylic acids such as isophthalic acid, terephthalic acid or adipic acid in a quantity of up to 90 mol%.

The starting components used according to the present invention include aliphatic, cyaloaliphatic aralipathic, aromatic or heterocyclic polyisocyanates (see Annalen 562, pages 75 to 136), for example, ethylene diisocyanate, 1,4-tetramethylene diisocyanate, 1,6-hexamethylene diisocyanate, 1,12-dodecane diisocyanate, cyclobutane-1,3-diisocyanate, cyclohexane -1,3- and -1,4-diisocyanate and mixtures of these isomers; 1-isocyanato-3,3,5-trimethyl-5-isocyanatomethyl cyclohexane (German Auslegeschrift No. 1,202 785), 2,4- and 2,6-hexahydrotolylene diisocyanate and mixtures of these isomers, hexahydro-1,3- and/or -1,4-phenylene diisocyanate, perhydro-2,4' and/or 4,4'-diphenymethane-diisocyanate, 1,3- and 1,4-phenylenediisocyanate, 2,4- and 2,6-tolylene diisocyanate and any mixtures of the isomers, diphenylmethane-2,4'-and/or 4,4'-diisocyanate, napthylene-1,5-diisocyanate, triphenylmethane-4,4',4"-triisocyanate, polyphenylpolymethylene polyisocyanates which may be obtained by aniline/formaldehyde condensation followed by phosgenation and which have been described, e.g. in British Pat. Nos. 874, 430 and 848 671; perchlorinated aryl polyisocyanates such as those described e.g. German Auslegeschrift No. 1,157,601; polyisocyanates containing carbodiimide groups as described in German Pat. No. 1,092,007; the diisocyanates described in U.S. Pat. No. 3,492,330; polyisocyanates containing allophanate groups as described e.g. in British Pat. No. 994, 890, Belgian Pat. No. 761, 626 and published Dutch Patent Application No. 7, 102, 524; polyisocyanates having isocyanurate groups as described e.g. in German Pat. Nos. 1,022 789, 1,222,067 and 1,027 394 and in German Offenlegungsschrift Nos. 1,929 034 and 2,004, 048; polyisocyanates having urethane groups as described e.g. in Belgian Pat. No. 752, 261 or in U.S. Pat. No. 3,394,164; polyisocyanates having acylated urea groups according to German Pat. No. 1,230 778; polyisocyanates having biuret groups as described e.g. in German Pat. No. 1, 101, 394, British Pat. No. 889, 050 and French Pat. No. 7,017,514; polyisocyanates prepared by telomerisation reactions as described e.g. in Belgian Pat. No. 723,640; polyisocyanates containing ester groups, e.g. those mentioned in British Pat. Nos. 956,474 and 1,072,956, U.S. Pat. No.

3,567,763 and German Pat. No. 1 231 688, and reaction products of the above-mentioned isocyanates with acetals according to German Pat. No. 1 072 358.

The distillation residues containing isocyanate groups from the commercial production of isocyanates may also be used, optionally as solutions in one or more of the above-mentioned polyisocyanates. Mixtures of the above-mentioned polyisocyanates may also be used.

Particularly suitable are isocyanates corresponding to the following general formula (III):

$$R^6-NCO)_z \quad (III)$$

wherein $R^6$ represents an alkyl group having from 2 to 20 carbon atoms optionally substituted with one or more halogen atoms, with one or more $C_1-C_{10}$ alkyl groups and/or one or more with $C_6-C_{12}$ aryl groups; an aryl group having from 5 to 12 carbon atoms, a cycloalkyl group having from 5 to 12 carbon atoms, an alkylaryl group having from 6 to 20 carbon atoms or an aryl or cycloalkyl group having from 5 to 12 ring carbon atoms and containing one or more hetero atoms such as N and/or O and/or S, and z represents an integer of from 1 to 4, preferably from 1 to 3, most preferably 2. Aliphatic groups having from 2 to 12 carbon atoms and aryl groups such as phenyl, tolyl, naphthyl, diphenylmethane and diphenylether are particularly preferred.

It is preferred to use commercially readily available mixture of tolylene diisocyanates, m-phenylene diisocyanate and phosgenated condensates of anilines and formaldehyde having a polyphenylene-methylene structure and the symmetric compounds, 4,4'-diisocyanatodiphenylmethane, 4,4'-diisocyanatodiphenylether, p-phenylenediisocyanate and 4,4'-diisocyantodiphenyldimethylmethane as well as isophorone diisocyanate and hexamethylene diisocyanates.

The isocyanates may be used in their free form or they may be used partly or completely in the form of their derivatives which react as isocyanate releasing compounds under the reaction conditions and can be obtained by reacting the free isocyanates with compounds containing reactive hydrogen.

The isocyanate releasing compounds used are preferably the addition products or lactams, oximes and CH-acidic compounds and the carbamic acid esters obtained from aliphatic monohydroxy and polyhydroxy compounds, for example those corresponding to the following general formula:

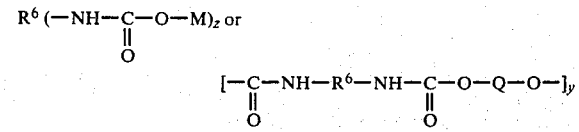

wherein $R_6$ and z are defined as above, M represents the organic group of a monohydroxyl compound and Q represents the organic group of a bis-functional or tris-functional hydroxyl compound, both M and Q, which may be identical or different, being preferably an aliphatic group having from 1 to 10 carbon atoms, a cycloaliphatic group having 5 to 10 carbon atoms or an aliphatic-aromatic group having from 7 to 12 carbon atoms; and y represents an integer of from 1 to 1000, preferably from 1 to 100.

Examples include the carbamic acid esters of monohydric aliphatic alcohols such as methanol, ethanol, propanol, isopropanol, butanol, isobutanol, cyclohexanol, allyl alcohol or benzyl alcohol and aliphatic diols or polyols such as ethylene glycol and trimethylolpropane, and the corresponding $C_1-C_6$ monoalkyl ethers; also the addition products with pyrrolidone-(2), caprolactam, butanone oxime, malonic esters, acetic acid esters and acetophenone.

The masked isocyanates may be used as such or prepared in situ by a reaction with the appropriate reactants.

Instead of the above-mentioned (poly)isocyanates, the analogous (poly)isothiocyanates may be used as the starting materials.

The process is generally carried out by dissolving the starting components in a lactone and optionally another inert non-phenolic solvent which is easily distilled off, adding the polyiso(thio)cyanate and heating for a considerable period of time. The polymer produced remains in solution and can be isolated by distilling off the solvent or by precipitating it with solvents such as ethanol, acetone or water. The quantity of starting compounds used may be chosen so that from 0.5 to 10 mol of iso(thio) cyanate groups are reacted per mol of the sum of reactive groups.

In the process according to the present invention, from 1 to 99 mol %, preferably from 10 to 90 mol % of the α-aminocarboxylic acid derivatives may be replaced by the cyclic anhydride compound.

Reaction temperatures in the range of from 0° to 500° C., preferably from 20° to 400° C. are used.

The reactions which take place may be accelerated by using known catalysts for the preparation of polyhydantoins, e.g. metal alcoholates or tertiary amines.

Other polymers may also be used in the process of the present invention, e.g. polyesters, polyamides, polyurethanes, polyolefines, polyacetals, polyepoxides, polyimides, polyamidoimides, polyiminopolyesters or polyimidoisocyanates. These materials may be added to the finished polymers of the present invention or they may be polymerised together with them.

According to a particular embodiment of the process, polyesters containing hydroxyl groups are added together with excess quantities of iso(thio)cyanate components. This results in a combination of (thio)hydantoin formation and urethane formation. For this purpose, mixtues of the polyhydroxyl compound the optionally masked polyiso(thio)cyanate and polyglycine derivative, for example, are polycondensed simultaneously, optionally after precondensation of two of these components.

The hydroxyl polyesters used are of a known type which can be obtained in the conventional manner from polycarboxylic acids, e.g. succinic, adipic, sebacic, phthalic, isophthalic, terephthalic or oleic acid and polyhydric alcohols, e.g. glycol, diethylene glycol, triethylene glycol, propylene glycol, dipropylene glycol, glycerol, trimethylolpropane or pentaerythritol.

The polymers obtained by the process according to the present invention are temperature resistant materials which remain stable up to a temperature of about 350° C. and have excellent mechanical properties. They may contain the usual additives for synthetic materials, such as fillers, pigments, antioxidants and plasticizers.

The polymers obtained according to the present invention are particularly suitable for lacquering metals, especially wires, for the production of electric insulation. For this purpose, the polymer solutions prepared according to the present invention may, if desired, be diluted to a solid content of from 5 to 80% by weight, preferably from 10 to 30% by weight by the addition of further or another lactone or another environmentally harmless non phenolic solvent and the lacquer solution is then applied by known methods, optionally after is has been mixed with another lacquer component, preferably a polyester. The lacquer obtained after stoving has excellent temperature resistance and electrical insulating properties.

EXAMPLE 1

275 g of 4,4'-disocyanato-diphenylmethane are dissolved in 410 g of butyrolactone, and 40 g of 4,4'-bis-(methoxycarbonlisopropylamino)-diphenylmethane and 192 g of trimellitic acid anhydride are added at 45° C. The mixture is then heated with stirring at 45° C. for 2 hours, 80° C. for 4 hours, 120° C. for 4 hours, 180° C. for 2 hours and 205° C. for 4 hours. The polyhydantoin imidoamide is obtained as an approximately 50% brown viscous solution having the characteristic bands for hydantoins and imides at 1725 and 1775 $cm^{-1}$ and an amide band at 1675 $cm^{-1}$ in the IR spectrum. The solution is diluted to a solid content of 25% by weight with N-methylpyrrolidone while still hot. The lacquer solution obtained in this way is used to lacquer a copper wire 0.7 m in diameter in a stoving oven as follows:

Length of oven: 4 m.
Oven temperature: 400° C.
Number of passages through the oven: 6.

At a draw-off rate of 11 m/min, a well levelled lacquer film is obtained which is found to have a thermal shock temperature of 260° C., a softening temperature of >325° C. and an abrasion resistance of 98.

EXAMPLE 2

60 g of 4,4'-bis-(methoxycarbonyl-isopropylamino)-diphenylmethane are dissolved in 530 g of butyrolactone, and 0.1 g of triethylenediamine is added as a catalyst. 37 g of 4,4'-diisocyanatodiphenylmethane are then added at 40° C. and the solution is heated and stirred for 2 hours at 55° C. 96 g of trimellitic acid anhydride and 127 g of 4,4'-diisocyanatodiphenylmethane are then added and condensation, which is accompanied by the elimination of $CO_2$ and methanol, is carried out with stirring for 2 hours at each of the temperatures, 80° C., 120° C., 160° C., 180° C., 190° C. and 200° C., and for 6 hours at 205° C. A brown, viscous solution of the polyhydantoin imidoamide having characteristic bands for hydantoins and imides at 1720 and 1775 $cm^{-1}$ and for amides at 1675 $cm^{-1}$ is obtained. The viscosity $\eta_{25}$ of the solution is 6570 mPa s after dilution to 30% by weight with butyrolactone.

A 25% solution of the reaction product is prepared by further dilution with butyrolactone, and this solution is used to lacquer a copper wire 0.7 mm in diameter in a stoving oven, as follows:

Length of oven: 4 m.
Oven temperature: 400° C.
Number of passages through oven: 6.

At a draw-off rate of 9 m/min, a lacquer having a softening temperature of >330° C., a thermal shock temperature of 260° C. and an abrasion resistance (NEMA) of 63 is obtained.

EXAMPLE 3

199 g of N,N'-bis-(methoxycarbonyl-isopropyl)-4,4'-diaminodiphenylmethane and 96 g of trimellitic acid anhydride are dissolved in 300 g of butyrolactone and 100 g of toluene. 250 g of 4,4'-diisocyanatodiphenylmethane are added at from 35° to 40° C. and the mixture is then stirred for 2 hours at from 35° to 40° C. After the addition of 0.5 g of triethylenediamine, the mixture is heated to 200° C. and condensed to completion for 6 hours at 200° C. By dilution with 470 g of benzyl alcohol there are obtained 1338 g of a 35% lacquer solution which has a viscosity $\eta_{25}$ of 290 mPa s after dilution to 15% with butyrolactone. The IR spectrum shows the characteristic bands for hydantoins and imides at 1720 and 1770 $cm^{-1}$ and the bands for amides at 1680 $cm^{-1}$.

After dilution with butyrolactone, a 22% solution of the reaction product is prepared and used for lacquering a copper wire 0.7 mm in diameter in a stoving oven.

Length of oven: 4 m.
Oven temperature: 400° C.
Number of passages through oven: 6.

At a draw-off rate of 10 m/min, a lacquer film having a softening temperature of >380° C., a thermal shock temperature of 260° C. and an abrasion resistance (NEMA) of 10 is obtained.

EXAMPLE 4

199 g of N,N'-bis-(methoxycarbonyl-isopropyl) 4,4'-diaminodiphenylmethane and 19.2 g of trimellitic acid anhydride are dissolved in 300 g of butyrolactone and 100 g of toluene, and to this solution are added 150 g of 4,4'-diisocyanatodiphenylmethane at from 35° to 40° C. The resulting solution is left to stand overnight. 0.5 g of triethylenediamine are then added and the solution is heated to 200° C. and condensed to completion at 200° C. for 6 hours, the methanol formed in the process of ring closure and the toluene put into the process distilling off during this time. After dilution with 465 g of butyrolactone, 1093 g of a 30% lacquer solution are obtained. After dilution with an equal quantity of butyrolactone, this solution has a viscosity $\eta_{25}$ of 1050 mPa s. The IR spectrum shows the characteristic bands for hydantoins and imides at 1720 and 1770 $cm^{-1}$ and for amides at 1680 $cm^{-1}$.

A 20% lacquer solution is prepared by further dilution with butyrolactone and is used for lacquering a copper wire 0.7 m in diameter in a stoving oven by a method analogous to that of Example 2.

At a draw-off rate of 10 m/min, a lacquer film having a softening temperature above 330° C., a thermal shock temperature of 260° C. and an abrasion resistance (NEMA) of 20 is obtained.

EXAMPLE 5

199 g of 4,4'-bis-(methoxycarbonyl-isopropyl amino)-diphenylmethane and 21.8 g of pyromellitic acid dianhydride are dissolved in 300 g of butyrolactone, and 150 g of 4,4'-diisocyantodiphenylmethane are added at from 35° to 40° C. The resulting solution is left to stand overnight 0.5 g of triethylene diamine are added, and the solution is heated to 200° C. and completely condensed at this temperature for 6 hours, the methanol formed in the process of cyclisation and the $CO_2$ liberated being discharged. After dilution with 310 g of butyrolactone, 944 g of a 35% lacquer solution are obtained. When diluted to a solid content of 15% with butyrolactone, this solution has a viscosity $\eta_{25}$ of 317 mPa s. The IR spectrum shows the characteristic bands for hydantoins and imides at 1720 and 1775 $cm^{-1}$.

A 20% lacquer solution is prepared by diluting the 35% solution with butyrolactone, and the diluted solution is used to lacquer a copper wire 0.7 m in diameter in a stoving oven in a manner analogous to that of Example 2.

At a draw-off rate of 10 m/min, a lacquer film having a softening temperature above 380° C., a thermal shock temperature of 260° C. and an abrasion resistance (NEMA) of 21 is obtained.

EXAMPLE 6

398 g of N,N'-bis-(methoxycarbonyl-isopropyl)-4,4'-diamino-diphenylmethane and 38.4 g of trimellitic acid anhydride are dissolved in 600 g of butyrolactone and 200 g of toluene, and to this solution are added 350 g of 4,4'-diisocyanatodiphenylmethane at from 35° to 40° C. The resulting solution is then stirred for 2 hours at from 35° to 40° C., 27 g of diethylene glycol monoethylether, 22 g of benzyl alcohol and 1 g of triethylenediamine are added, and the reaction mixture is heated to 200° C. and condensed at this temperature for 6 hours, the toluene put into the process and the methanol formed in the course of cyclisation being distilled off. In addition, approximately 415 g of butyrolactone are distilled off by the application of a light vacuum so that about 940 g of an approximately 75% resin which becomes brittle on cooling are obtained. A 15% solution of this resin in butyrolactone has a viscosity $\eta_{25}$ of 420 mPa s.

1% of titanium tetrabutylate is added to a lacquer solution consisting of 1 part by weight (based on the solid content) of the resin described above and 1 part by weight of a polyester prepared from 1 mol of dimethylterephthalate, 0.5 mol of glycerol and 2 mol of ethylene glycol and having a hydroxyl content of 4%, and the solution is used to lacquer copper wires 0.9 mm in diameter in a manner analogous to that of Example 2 at a draw-off rate of 11 m/min. The lacquered wires obtained in this way were found to have a softening temperature of 320° C. and a thermal shock temperature of 260° C.

We claim:

1. A process for the preparation of poly(thio) hydantoins containing amidoimide groups comprising reacting a polyfunctional α-aminocarboxylic acid, amide or ester with organic polyiso(thio)cyanates wherein the reaction is carried out in a lactone solvent with the addition of a carboxylic acid anhydride of the formula

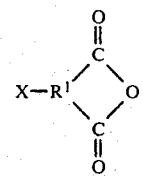

wherein $R^1$ is a $C_2$–$C_{10}$ aliphatic moiety, a $C_5$–$C_{10}$ cycloaliphatic moiety of a $C_6$–$C_{20}$ aromatic moiety, and X is another cyclic anhydride moiety, a carboxyl or a hydroxyl.

2. A process as claimed in claim 1, wherein said additional group capable of condensation is a carboxyl group.

3. A process as claimed in claim 2, wherein trimellitic acid anhydride is used.

4. A process as claimed in claim 1, wherein lactones having from 3 to 16-C-atoms are used as solvents.

5. A process as claimed in claim 4, wherein α-butyrolactone is used.

6. Lacquer mixtures, containing poly(thio)hydantoin prepared according to claim 1.

7. Lacquer mixtures as claimed in claim 6, having a solid content of from 5 to 80% by weight.

8. Lacquer mixtures as claimed in claim 6 containing a mixture of said poly(thio)hydantoin and a polyester.

9. Heat resistant coating materials, foils, adhesives and moulded articles obtained from polyhydantoins as prepared in claim 1.

10. Stoving lacquers containing poly(thio)hydantoins prepared according to claim 1.

* * * * *